Feb. 23, 1932. U. C. PEMBERTON 1,846,355
SURFACE RIDING BAIT OR LURE
Filed July 17, 1931
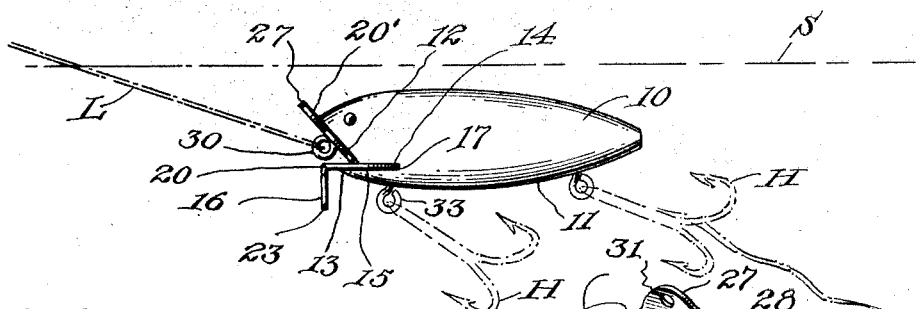
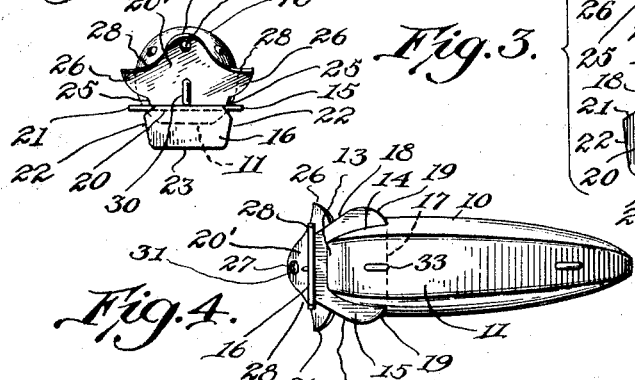
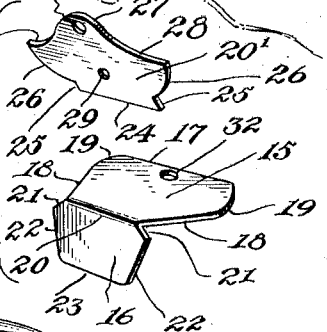
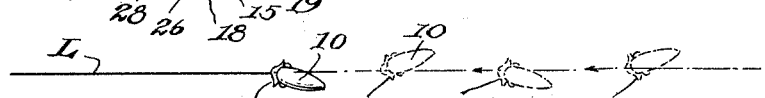
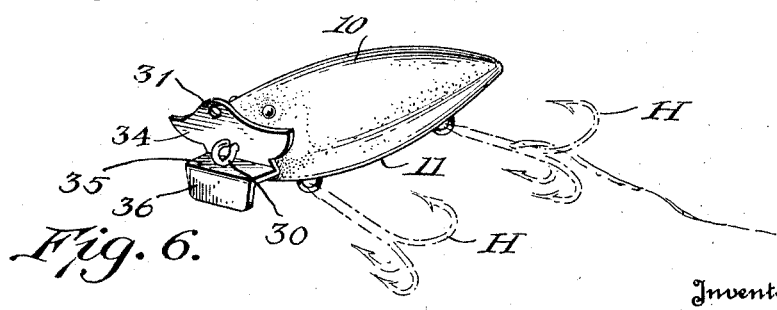
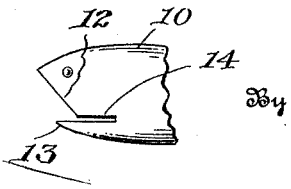
Inventor
Uz C. Pemberton
By Eugene C. Brown
Attorney Patented Feb. 23, 1932

1,846,355

UNITED STATES PATENT OFFICE

UZ C. PEMBERTON, OF TAMPA, FLORIDA

SURFACE RIDING BAIT OR LURE

Application filed July 17, 1931. Serial No. 551,501.

This invention relates to fishing and more particularly to a trolling bait or lure designed to be drawn through the water just beneath the surface.

Among the principal objects of the present invention are to provide a fish lure operating equally well as a surface and as underwater lure; to produce an improved lure wherein the action and surface performance will be so stabilized that the proper action will be obtained with the smallest sized bait equally as well as with larger sizes; to provide an improved fish lure wherein the necessity for a number of hooks or one or more weights for holding the lure in upright position will be eliminated whereby the lure without such hooks or weights will ride correctly and will not turn over; to produce an improved mouth-piece for such a lure which will cause the lure, when in use, to wriggle rapidly from side to side with a life like motion attractive to fish; to produce an improved lure having a rapid wriggling motion not possible with lures loaded with weights or many hooks; and to produce an improved lure wherein the legal limitations in regard to the number of hooks carried by the lure may be complied with without in any way affecting the stability or action of the lure.

In the following detailed description of the construction and operation of my improved bait or lure, I shall refer to the accompanying drawings in which—

Figure 1 is a side elevation of the improved bait or lure in use and travelling just below the surface of the water.

Figure 2 is a front elevation of the lure.

Figure 3 is a disassembled perspective view showing the parts of the mouthpiece.

Figure 4 is a bottom plan view of the lure.

Figure 5 is a diagram showing the action of the lure as it is pulled through the water in use.

Figure 6 is a perspective view of the lure in slightly modified form.

Figure 7 is a side elevation of the forward part of the body in the form shown in Figure 1, the mouthpiece being removed.

In the embodiment of the invention here shown in Figures 1 to 4 inclusive, a body 10 of substantially pisciform shape is provided with a transversely flattened under surface 11 extending from nose to tail. The forward end or nose of the body 10 is truncated at 12 on a plane extending downwardly and rearwardly from the top of the body to a point slightly above the bottom. The bottom extends slightly forward at 13 from the lower edge of this truncated portion and a horizontal slot 14 extends rearwardly from the angle formed by the plane 12 and forwardly extending portion 13, the lower side of the slot and the top face of the portion 13 being in the same horizontal plane.

The lower mouthpiece is formed of a plate of thin metal bent intermediate its ends to provide a horizontal portion 15 and a vertical portion 16 extending downwardly from the front edge of the portion 15. The portion 15 has a straight rear edge 17 and forwardly converging side edges 18, which are connected to the rear edge by arcuate or rounded corner edges 19. The edge 17 is of a length substantially equal to the width of the rear or inner end of the slot 14, so that the rounded corners and sides project slightly on each side of the body and the forward edge of the portion 15, formed by the angle 20 is spaced forwardly of the front edge of the projection 13. The portion 16 has a generally trapezoidal form with the longer parallel side uppermost but the upper angles are truncated as at 21 and extend outwardly and downwardly from the ends of the edge or angle 20 to meet the downwardly converging side edges 22 which terminate at the bottom edge 23, thus being parallel to the angle 20. This portion 16 projects somewhat below the lowest point of the body 10.

The upper mouthpiece is formed from a single flat metal plate 20', which lies against the surface 12 with its straight bottom edge 24 resting on the portion 15 of the lower mouthpiece. This edge is substantially the same width as that part of the portion 15 whereon it rests. Short upwardly diverging edges 25 extend upwardly from the ends of the edge 24 and the sides of the plate extend laterally outward from these edges 25, being bounded below by convex lower edges 26 starting from the upper ends of the edges 25 and curved outwardly and upwardly therefrom. The upper edge of this plate is sinuous in form having a high convex central portion 27 merging into comparatively low concave portions 28. The upper part of the plate 20' projects considerably above the front or nose of the body 10 and the lateral portions or fins project well beyond the sides of the body. In the plate 20' is formed an opening 29 through which a screw eye 30 passes into the body 10 and serves both to hold the plate 20' in position and as a means for attaching a fishing line L. The eye portion of this screw eye is located vertically above the part 16. The plate 20' also has an opening 31 at its upper part for attachment of the line when it is desired to have the lure move through the water considerably below the surface S, the eye 30 being used when the lure is to be kept close to the surface.

The lower mouthpiece is also provided with an opening 32 to receive a screw eye 33, which is screwed through the bottom of the body and serves to hold the lower mouthpiece in place and to form an attaching means for one of the hooks H with which the lure is provided.

The form shown in Figure 6 is quite like that previously described except that the slot 14 is omitted and the upper and lower mouthpieces are formed of a single metal plate bent to provide an upper mouth portion 34, of the same contour as the part 20', and a lower mouthpiece having a horizontal portion 35 and a vertical portion 36. The portion 35 does not, as in the previous form, extend rearwardly of the upper part 34 so that no lateral horizontal fins are formed behind the part 34. An eye 30 is used to hold the mouthpiece and for attachment of a line. It will be observed that the eye openings 30 are almost directly above the lip or lower portions 16 and 36 of the respective mouthpieces.

From the foregoing it is to be seen that each form has a body provided with a sheet metal mouthpiece arranged to form a forwardly opening acute dihedral angle having its lower side horizontal and provided with a vertical lip depending from its forward edge. It will also be seen that the upper side of each dihedral angle is provided with acuminate lateral fin portions, convex on their lower edges and concave on their upper edges.

When the lure is pulled through the water, the impact of the water against the depending lip 16, tends to cause the lure to submerge or dive. This downward tendency is opposed by the action of the forwardly inclined plate member 20'. These opposing forces are so balanced that the lure rides just below the surface, a result which has not hitherto been attained. In order to stabilize the bait and guide it steadily I project the horizontal plate portion 15 forwardly a short distance in front of the lower edge of the upper inclined portion 20'. The stabilizing action is so complete that the necessity of loading the bait with lead or excessive hooks for the purpose of maintaining the equilibrium of the bait is entirely eliminated and even the smallest bait with one or two sets of treble hooks will operate and perform perfectly close to the surface of the water. Attempts have been made hitherto to cause a lure to ride near the surface by attaching the line below the upper edge of a vertical plate but without success as this causes the lure to turn over. I believe that my construction is the first to accomplish this purpose successfully.

The pressure of the water against the vertical plate or lip 16 is overcome by the towing of the lure, causing the water to be thrown off, first to one side and then to the other thereby causing the lure to swing laterally back and forth. By attaching the tow line immediately above and in vertical alinement with the vertical lip 16, the vertical axis or oscillatory center of the lure or bait lies at the point of least resistance to lateral oscillation so that the lure has unrestricted freedom to act and oscillates laterally about this axis with a rapidity hitherto unattained. This rapid action is enhanced by the very light weight which it is required to carry. The rapid side wriggle produces such a life like appearance that artificiality is completely overcome which is a most desirable feature in a fish lure.

The upper forwardly inclined plate must have sufficient surface area to overcome the downward tilting action caused by the pressure against the lower vertical lip or plate 16, yet it must be so designed that the water in front will not be pressed into a ridge or bank up into a wave to produce an unnatural appearance and cause the water to break over the top at intervals, partially submerging it and interfering with its action. I have overcome this difficulty by cutting the upper edge of the forwardly inclined plate to form concavities upon each side which permit the water to flow smoothly over the top without producing any noticeable ripple. In order to retain sufficient surface area I extend the sides into wing formations or fins with convex lower edges. The wing extensions provide an added leverage to assist the lower vertical plate in swinging the bait from side to side. It will be observed that the points of these wing extensions or fins lie in the same vertical plane as the vertical plate or lip.

From the above description of the structural details it will be seen that all of the parts or elements of this bait or lure are so coordinated that they combine to produce the very rapid wriggling movements at the surface or submerged which simulate life like actions heretofore unattained.

I claim:—

1. An artificial bait or lure having a body provided at its forward end with a mouthpiece arranged to form a forwardly opening acute dihedral angle having its lower side horizontal and provided with a vertical lip depending from its forward edge, and a towing eye arranged centrally of the width of the lure in said angle and in the plane of the lip.

2. An artificial bait or lure having a body provided at its forward end with a mouthpiece arranged to form a forwardly opening acute dihedral angle having its lower side horizontal and provided with a vertical lip depending from its forward edge, and a towing eye arranged centrally of the width of the lure in said angle and in the plane of the lip, the upper side of the dihedral angle having acuminate lateral fins convex on their lower edges and concave on their upper edges.

3. An artificial bait or lure having a body provided at its forward end with a mouthpiece arranged to form a forwardly opening acute dihedral angle having its lower side horizontal and provided with a vertical lip depending from its forward edge, and a towing eye arranged centrally of the width of the lure in said angle and in the plane of the lip, the upper side of the dihedral angle having acuminate lateral fins convex on their lower edges and concave on their upper edges, said fins having their points in the plane of said lip.

4. The lure of claim 1 having the lower side of the dihedral angle extending rearwardly of the upper side and projecting laterally at its rear portion to form horizontal fins.

5. The lure of claim 1 having the mouthpiece formed from a single sheet of metal and the forward end of the body notched to form a seat for the portions of the metal forming the dihedral angle and having the towing eye pass through the upper side of the dihedral angle to secure the mouthpiece in place.

6. The lure of claim 1 having a second towing eye at the upper portion of the mouthpiece.

In testimony whereof, I affix my signature.

UZ C. PEMBERTON.